Patented June 18, 1940

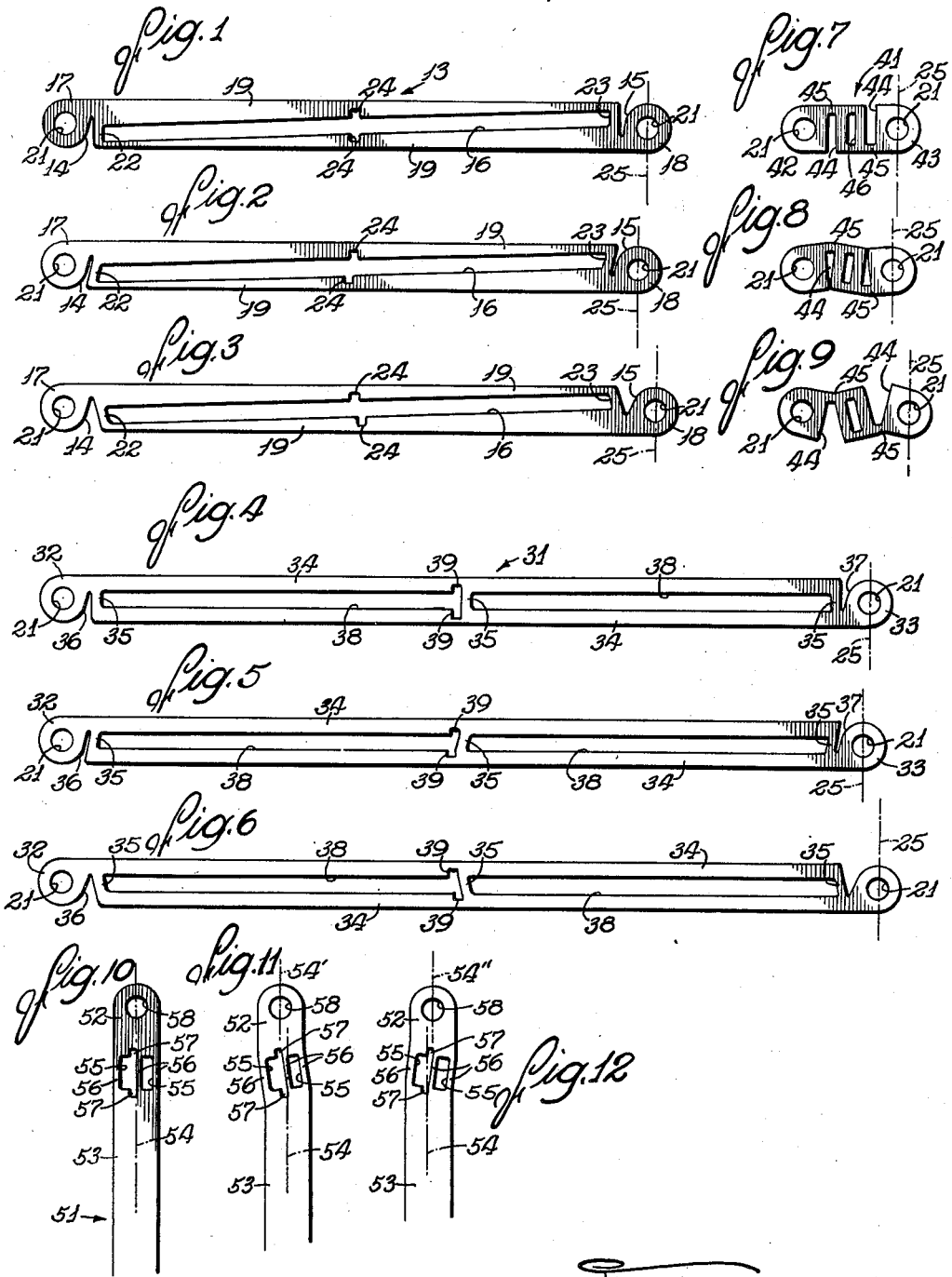

2,205,065

UNITED STATES PATENT OFFICE 2,205,065

ADJUSTABLE LINK

Maron W. Newcomb, Glen Ellyn, Ill.

Application February 14, 1940, Serial No. 318,887

9 Claims. (Cl. 74—586)

The invention relates to improvements in connecting devices or links for interconnecting relatively light machine elements and more particularly to adjustable links.

Various machines of the type commonly known as business machines include elements adapted to be actuated by manually operable keys or the like acting through mechanical linkages. In many cases the limit position of an element or its range of movement must be accurately determined and adjusted with respect to some other element after the machine has been completely assembled. Such adjustments are usually relatively small and are required only infrequently as when the machine is initially assembled or when parts are repaired or replaced. Accordingly, the adjustments are most conveniently made by varying a characteristic such as the effective length of one of the members or links constituting the linkage through which the element is actuated.

Various types of adjustable links have been proposed for use under the above conditions. One of the most common of these links consists of two relatively movable sections locked together by a headed screw projecting through a slot in one of the elements and threading into the other element. The adjustment of such a link is effected by loosening the screw and sliding one section over the other. Thereafter the screw must be tightened to hold the sections in their new positions. Accurate adjustment of such links is difficult and time consuming, particularly in the cramped space ordinarily available in machines of the character above referred to. Moreover, the links are relatively expensive to manufacture because of the numerous machine operations involved.

Another type of adjustable link designed to overcome certain defects in the sectional link consists of a metal strip having a deformable portion, usually in the form of a pair of outwardly bowed members, adapted to be crushed together or pried apart to decrease or increase the effective length of the link. Adjustments in this instance are effected by means of a special tool of the plier type. Such links are suitable for use only under conditions where the adjustments are not critical but are unsatisfactory for use with elements requiring accurate location. A further disadvantage is that the tool utilized for effecting the adjustment is relatively large and requires a substantial amount of space for proper manipulation. Sufficient space is seldom available in machines in which the mechanisms are as compactly arranged as in most modern business machines.

With the above in view, the primary object of the invention is to provide an improved connecting link which is capable of extremely accurate adjustment by simple rotative movements of an elongated tool blade such as a screw driver or the like, which makes the link particularly suitable for use in machines of the character above referred to.

Another object is to provide a metal link whose effective length can be readily increased or decreased by means of a simple tool adapted for manipulation in a minimum of space.

Still another object is to provide a metal link which can be adjusted with a high degree of precision and which is capable of being manufactured at relatively low cost.

Other objects and advantages of the invention will become apparent from the following detailed description of the preferred forms shown in plan view in the accompanying drawing in which:

Figure 1 is a view of one form of connecting link embodying the features of the invention, the link being shown in its normal or non-adjusted condition.

Fig. 2 is a view showing the link adjusted to decrease its effective length.

Fig. 3 is a view showing the link adjusted to increase its effective length.

Fig. 4 is a view of a modified form of the link suitable for use where the machine elements to be interconnected are spaced a substantial distance apart.

Fig. 5 is a view showing the link of Fig. 4 adjusted to decrease its effective length.

Fig. 6 is a view showing the link of Fig. 4 adjusted to increase its effective length.

Fig. 7 is a view of another form of link suitable for interconnecting closely spaced machine elements.

Fig. 8 is a view showing the link of Fig. 7 adjusted to decrease its effective length.

Fig. 9 is a view showing the link of Fig. 7 adjusted to increase its effective length.

Fig. 10 is a view of a modified form of link adapted for adjustment laterally of its longitudinal axis.

Fig. 11 is a view showing the link of Fig. 10 adjusted to offset the end portion on one side of the axis.

Fig. 12 is a view showing the link of Fig. 10 adjusted to offset the end portion on the other side of the axis.

While I have shown and will hereinafter describe in detail the exemplary links illustrated in the drawing, it is to be understood that the invention is not limited to the precise forms shown but that various modifications and adaptations may be made by those skilled in the art without departing from the spirit and scope of the invention as expressed in the appended claims.

In carrying out the invention, I construct the link in the form of an elongated metal strip having cut-out portions defining rigid end sections connected by integral webs or cross members of reduced cross sectional area capable of being permanently deformed by bending in either of two directions in the plane of the strip to vary the relative positions of the rigid sections. This variation of position usually, although not invariably, results in increasing or decreasing the effective length of the link. The metal employed in the links is preferably relatively soft so that the webs on being deformed by the application of a bending force, remain in deformed condition after the application of force is discontinued and thus serve to maintain the parts of the link in the position to which they have been adjusted.

To facilitate adjustment, the rigid sections of link are provided with means engageable by opposite side edges of an elongated tool blade such as a screw driver blade. The tool blade when engaged with the link is centered substantially on the longitudinal axis of the same and disposed generally perpendicular to its plane. With this arrangement the thrust of the blade when rotated about its longitudinal axis tends to shift the rigid members of the link in opposite directions. This force is transmitted to the reduced portions or webs of the link through the rigid sections to bend them in one direction or the other depending upon the direction in which the tool is rotated. By utilizing this type of tool movement, precision adjustment is readily obtained since, as is well known, a rotative movement of a hand tool may be controlled with far greater accuracy than other types of movements.

Referring now to the drawing, the link shown in Figs. 1–3 may be conveniently formed from an elongated flat metal strip 13. Generally V-shaped notches 14 and 15 are cut in opposite side edges of the strip adjacent the respective ends, and these, with an elongated slot 16 punched or cut in the central portion of the strip, define rigid end sections 17 and 18, each having an integral projection 19 extending toward the other section and forming parallel side members of the link. As herein shown, each end section is apertured as at 21 for the reception of a screw or the like by which the link may be connected to the machine elements.

The rigid sections of the link in this instance are connected by webs or cross members 22 and 23, also defined by the notches and the slot above described. These webs are formed with a cross sectional area such as to permit the member to bend readily when a force is applied to the side members tending to shift them longitudinally in opposite directions and yet providing sufficient strength to hold the end sections in predetermined relation against the forces normally met with in the ordinary operation of the machine. By employing a relatively soft metal in the link, the webs when bent or deformed, remain in their deformed condition after the application of the bending force is discontinued. In order to avoid any possibility of the side members being deformed by the force applied to bend the connecting webs, the slot 16 may be disposed diagonally of the link as shown in Fig. 1 so that the members taper gradually in the direction of their length, being widest at the end adjacent the end section of which they form a part.

To facilitate the application of a bending force to the webs, each side member is provided with suitable tool engaging means. As herein shown, this means comprises oppositely facing notches or indentations 24 cut in the adjacent inner edges of the side members 19, preferably at or near the center of the link. These indentations are alined transversely of the link and are suitably dimensioned to receive opposite side edges of a narrow tool blade as, for example, a screw driver blade. The tool when engaged in these indentations, is centered substantially on the longitudinal axis of the link and is disposed generally perpendicular to the plane thereof.

When a tool blade engaged with the link in the above manner is rotated about its longitudinal axis, it tends to shift the rigid sections of the link in opposite directions. Thus when the tool is rotated in a clockwise direction, the end section 17 and its associated side member 19 are shifted to the right (as viewed in Fig. 2) while end section 18 and its associated side member 19 are shifted to the left. As a result, the webs 22 and 23 are bent to the position shown in Fig. 2, thus decreasing the spacing of the apertures 21 in the end sections as indicated by the displacement of the center line 25 with respect to the corresponding line shown in Fig. 1. In this way the effective length of the link is reduced.

To increase the effective length of the link, the tool blade is engaged in the manner above described and rotated in a counterclockwise direction. The thrust of the tool is thus transmitted to the side members 19 tending to shift the upper member to the left and the lower member to the right as shown in Fig. 3. Webs 22 and 23 are accordingly bent to the position shown in this figure and the spacing of the apertures 21 is increased as indicated by the displacement of the center line 25 with respect to the corresponding lines of the preceding figures. It will be understood, of course, that the degree of movement imparted to the rigid sections of the link is dependent upon the angle through which the tool blade is turned but, in any case, it is subject to extremely accurate control since it is effected solely by rotation of the elongated tool blade about its longitudinal axis.

Referring now to Figs. 4–6, the link therein shown is of the same general type as the link above described, differing primarily in its length to adapt it for connecting widely spaced machine elements. As in the case of the first link, the link of Fig. 4 is formed from an elongated flat metal strip 31 having end portions 32 and 33, each rigid with a side member 34 projecting toward the other section. The apertures 21 in the end sections provide for connection of the link to the machine elements. The side members 34, in this instance, are connected by a plurality of webs 35, three in the particular link shown. The end sections, side members and webs are defined by V-shaped notches 36 and 37 in opposite side edges of the strip, and elongated slots 38 extending longitudinally of the strip. It will be understood, of course, that the number of webs 35 provided may be increased if desired to enable the link to withstand greater operating forces without change in length.

Tool engaging means herein shown as notches 39 are cut in the adjacent inner edges of the side members 34. These notches serve to transmit the thrust of the tool blade to the rigid portions of the link when the tool is rotated. Thus by rotating the tool in a clockwise direction, the end sections of the link are shifted toward each other and the webs 35 are bent toward the position shown in Fig. 5. The effective length of the link is thus decreased as indicated by the displacement of the center line 25 with reference to the corresponding line of Fig. 4. The effective length of the link may be increased by rotating the tool in a counterclockwise direction to displace the end sections and bend the webs 35 toward the position shown in Fig. 6. In this case the center line 25 is displaced to the right with reference to the corresponding center line of Fig. 4.

Where the machine elements to be interconnected are relatively close together, it is preferred to employ a link constructed in accordance with the form shown in Figs. 7–9. This link, like those above described, is formed from an elongated flat metal strip 41 and has rigid end sections 42 and 43 defined by notches 44 in opposite side edges of the strip. The end sections are provided with the several apertures 21 for connection with the machine elements. The notches 42 and 43 leave a reduced neck or web 45 connecting diagonally opposite corners of the central portion of the link with the respective end sections, the central portion being generally rectangular in form.

Tool engaging means is provided in the central portion of the link. This means is herein shown as a laterally disposed slot 46 dimensioned to receive the end of an elongated tool blade as before described. When the tool blade is rotated about its longitudinal axis the central portion of the link is turned correspondingly and the webs 45 yield or bend under action of the applied force. Thus, when the tool is turned in a clockwise direction, the webs 45 are bent inwardly toward the position shown in Fig. 8, thereby decreasing the effective length of the link as indicated by the displacement of the center line 25 with respect to the corresponding center line of Fig. 7.

When the tool blade is rotated in a counterclockwise direction, the webs 45 are bent in the opposite direction or toward the position shown in Fig. 9 to increase the spacing of the end sections of the link. The amount of this displacement depends, of course, upon the angle through which the central section of the link is turned.

Under certain types it may be desirable to adjust a link by displacing one section laterally relative to the other section. A link adapted for this type of adjustment is shown in Figs. 10–12 as formed from an elongated flat metal strip 51. In its initial form shown in Fig. 10, the link comprises an end section 52 having an aperture 58 located on the center line of the main portion 53 of the link, the center line being indicated by the reference character 54. Spaced parallel slots 55 are cut or punched in the strip between the end section and the main portion of the strip to define a series of connecting webs 56 of reduced cross sectional area capable of being deformed by the twisting action of a tool blade inserted in oppositely facing notches 57 in the respective sections of the link. Thus when the tool blade is turned in a counterclockwise direction, the webs are bent toward the position shown in Fig. 11. The center line of the aperture 58 is thus shifted toward the position indicated by the broken line 54' or to the left of the center line 54 as shown in Fig. 11. When the tool blade is turned in a clockwise direction, the center line of the aperture 58 is shifted toward the position indicated by the broken line 54'' or to the right of the center line 54 as shown in Fig. 12. The webs 56 in this instance are bent toward the position shown in Figure 12.

It will be apparent from the foregoing that the invention provides an adjustable connecting link of novel and advantageous character. The link is of simple construction and capable of being manufactured at relatively low cost. Moreover it is susceptible of extremely accurate adjustment by simple rotative movements of an elongated tool blade such as a screw driver or the like which renders it particularly suitable for use in machine organizations having limited space for tool manipulation.

I claim as my invention:

1. As an article of manufacture, a metal link having rigid sections adjustable with respect to each other by rotative movements of an elongated tool blade about its longitudinal axis, said link comprising an elongated flat metal strip having portions cut out to define the rigid sections and deformable webs of small cross sectional area connecting the sections, and means for transmitting the thrust of the tool blade to said webs including notches in the rigid sections engageable by opposite side edges of the blade acting to shift one section relative to the other in a direction determined by the direction of rotation of the blade, said webs bending to conform to the new positions of the sections and remaining in their bent condition after the tool blade is withdrawn.

2. As an article of manufacture, a metal link for interconnecting machine elements adjustable with respect to its effective length by rotative movements of an elongated tool blade about its longitudinal axis, said link comprising an elongated flat metal strip having portions cut out to define rigid end sections and deformable webs of small cross sectional area connecting said end sections all disposed in the same place, and means engageable by opposite side edges of an elongated tool blade positioned with its longitudinal axis substantially perpendicular to said plane acting to shift the end sections in opposite directions when the blade is rotated about its axis, said webs bending to permit relative movement of the end sections and acting to hold the sections in the positions to which they have been shifted after the tool blade is withdrawn.

3. An adjustable connecting link in the form of an elongated generally rectangular flat metal strip having rigid end sections, integrally formed webs of small cross section connecting said end sections and adapted for limited bending in either of two directions in the plane of the link, said webs being disposed relative to the end sections so as to increase the effective length of the link when bent in one direction and to decrease the effective length of the link when bent in the other direction, and tool engaging portions adapted for engagement by the tip portion of an elongated flat tool blade positioned substantially perpendicular to the plane of the link and effective to transmit the thrust of the tool blade to the webs when the tool is rotated in either direction about its longitudinal axis.

4. As an article of manufacture, a metal link for interconnecting machine elements adjustable with respect to its effective length by rotative movements of an elongated tool blade about its longitudinal axis, said link comprising an elongated flat metal strip having notches in opposite side edges and a longitudinally extending slot defining end sections each with a rigid projection extending toward the other section, cross members of relatively small cross sectional area connecting said projections at a plurality of points, and tool engaging means on each projection engageable by opposite side edges of the tool blade and effective when the tool blade is rotated to transmit the thrust to the end sections through said projections so as to shift the same endwise in opposite directions, said cross members bending to accommodate such relative movement and remaining in their bent condition to maintain the end sections in their shifted positions after the tool blade is withdrawn.

5. As an article of manufacture, a metal link for interconnecting machine elements adjustable with respect to its effective length by rotative movements of an elongated tool blade about its longitudinal axis, said link comprising an elongated flat metal strip having end sections each with a gradually tapering projection extending longitudinally of the link toward the other section defined by notches in opposite side edges of the strip and an elongated slot disposed diagonally of the strip in the central portion thereof, relatively narrow cross members connecting the projections at a plurality of points, and oppositely facing notches in adjacent side edges of the projections engageable by the tool blade for transmitting the thrust of the blade when rotated to the projections so as to shift the same endwise in opposite directions and thus alter the effective length of the link, said cross members bending to accommodate such movement and maintaining their bent condition until altered by another application of force thereto.

6. As an article of manufacture, a metal link for interconnecting machine elements adjustable with respect to its effective length by rotative movements of an elongated tool blade about its longitudinal axis, said link comprising an elongated flat metal strip having end sections each with an integral rigid side member extending toward the other section, a plurality of relatively narrow cross members connecting said side members at spaced points along their length, said sections, said side members and said cross members being defined by notches in opposite side edges of the strip and a series of elongated slots extending longitudinally of the strip, alined notches in the adjacent inner edges of the side members adapted for the reception of the tool blade and effective when the blade is rotated to shift the side members longitudinally in opposite directions and thus alter the effective length of the link, said cross members bending to accommodate the movements of the side members and remaining in bent condition after the tool is withdrawn to maintain the shifted parts in their new positions.

7. As an article of manufacture, a flat sheet metal link for interconnecting machine elements adjustable with respect to its effective length by rotative movements of an elongated tool blade about its longitudinal axis, said link comprising end sections adapted to be secured to the machine elements, a generally rectangular central section connected with the respective end sections by integral webs of reduced cross sectional area disposed at opposite side edges of the section, and means for engaging the tool blade with the central section to rotate therewith and thus vary the angular relationship of that section with respect to the end sections whereby to increase or decrease the effective length of the link, said central webs bending in the movement of the central section and remaining bent to maintain the link in adjusted condition after the tool is withdrawn.

8. As an article of manufacture, a flat sheet metal link having a pair of rigid sections displaceable one relative to the other by rotative movements of an elongated tool blade about its longitudinal axis, a plurality of relatively narrow webs connecting the rigid sections, means on the rigid sections engageable by opposite side edges of the tool blade acting when the tool is rotated to shift one section relative to the other, said webs being permanently bent in the shifting of the sections to maintain the sections in their adjusted positions.

9. As an article of manufacture, an elongated flat sheet metal link having a pair of rigid sections one of which is displaceable laterally relative to the longitudinal axis of the link by rotative movements of an elongated tool blade about an axis perpendicular to the plane of the link, a plurality of relatively narrow webs connecting the sections, said webs being defined by spaced parallel slots extending generally longitudinally of the link, and alined notches in the respective sections engageable by opposite side edges of the tool blade effective when the tool is rotated to transmit the thrust to the sections and thus shift one section laterally of the axis of the link, said webs being permanently bent to maintain said one section in its shifted position.

MARON W. NEWCOMB.